United States Patent [19]
Yamanishi

[11] Patent Number: 6,100,624
[45] Date of Patent: Aug. 8, 2000

[54] ULTRASONIC MOTOR AND SEAT BELT RETRACTOR

[75] Inventor: Takahiro Yamanishi, Shiga, Japan

[73] Assignee: Takata Corporation, Tokyo, Japan

[21] Appl. No.: 09/115,534

[22] Filed: Jul. 15, 1998

[51] Int. Cl.[7] .................................................. H02N 2/00
[52] U.S. Cl. ........................................................ 310/323.09
[58] Field of Search .......................... 310/323.09, 323.08

[56] References Cited

U.S. PATENT DOCUMENTS

| | | | |
|---|---|---|---|
| 5,313,132 | 5/1994 | Nakanishi | 310/323.09 |
| 5,821,669 | 10/1998 | Shin | 310/323.09 |

FOREIGN PATENT DOCUMENTS 10-117486  5/1998  Japan .

Primary Examiner—Nestor Ramirez
Assistant Examiner—Peter Medley
Attorney, Agent, or Firm—Kanesaka & Takeuchi

[57] ABSTRACT

An ultrasonic motor capable of adjusting the degree of contact strength between the rotor and the stator. The ultrasonic motor for driving a reel of a seat belt retractor includes a stator, a rotor, and a spring. The pressing force by the spring is adjusted by moving a clutch shaft in a back-and-forth direction. The clutch shaft is moved by a clutch control ultrasonic motor.

8 Claims, 4 Drawing Sheets

ULTRASONIC MOTOR AND SEAT BELT RETRACTOR

FIELD OF THE INVENTION AND RELATED ART STATEMENT

The present invention relates to an ultrasonic motor and a seat belt retractor in which the ultrasonic motor is used.

An ultrasonic motor has an annular stator in which an array of piezoelectric elements is arranged in an annular shape and a rotor disposed to face the annular stator. Conventionally, the rotor is biased against the stator by a dish-shape spring disposed coaxially with the stator and the rotor. The spring and the rotor are connected to a rotor shaft so as to rotate integrally.

Applying voltage having frequencies within the ultrasonic range to the piezoelectric elements produces circumferential vibration (traveling waves) in the stator. The rotor is rotated about its axis by the vibration.

The ultrasonic motor becomes in a stopped state in which the rotor and the stator are in close contact with each other, when the voltage application is stopped to the piezoelectric elements.

In the stopped state, the stopping torque of the rotor is quite large.

Accordingly, consideration has been made to use such an ultrasonic motor as a power-driving source of the electric seat belt retractor. When the ultrasonic motor is directly connected to the seat belt retractor, the reel can be directly driven by the ultrasonic motor. As the current to the ultrasonic motor, is stopped the rotation of the reel is blocked by the large stopping torque of the rotor of the ultrasonic motor.

Since the ultrasonic motor is small and has good durability, it is suitable for use in a seat belt retractor.

In a seat belt retractor in which an ultrasonic motor is built in as a reel driving device, it is important that the rated speed (r.p.m.) of the ultrasonic motor matches the normal retracting speed and the normal withdrawing speed (r.p.m.) of the reel.

As the rated speed of the ultrasonic motor is too high as compared to the reel speed, the seat belt is too rapidly retracted or too rapidly withdrawn.

On the contrary, as the rated speed of the ultrasonic motor is too low, it is slow relative to the speed at which the seat belt is withdrawn by a user so that the resistance of withdrawing the seat belt increases, thereby inconveniencing the user in withdrawing the seat belt.

OBJECT AND SUMMARY OF THE INVENTION

The present invention is made in consideration of the problems described above and has an object to provide an ultrasonic motor with a clutch function in a torque transmitting mechanism between the rotor and stator and a seat belt retractor using the ultrasonic motor.

An ultrasonic motor of the present invention has an annular stator in which an array of piezoelectric elements is arranged in an annular shape, a rotor disposed to face the annular stator, and a pressing member or device for making the rotor and the annular stator to be in close contact with each other. In the ultrasonic motor, the pressing force of the pressing member is variable.

By designing the pressing force of the pressing member to be variable, the torque transmitted between the stator and the rotor of the ultrasonic motor can be reduced or cancelled.

It is preferable that the pressing member is an elastic member and the pressing force can be varied by moving the elastic member in an axial direction of the ultrasonic motor.

Preferably employed as a mechanism for moving the elastic member is a mechanism comprising a rotational shaft, an end of which is engaged with the elastic member, a shaft-driving motor connected to the other end of the rotational shaft, a male thread formed on the rotational shaft, and a female thread into which the male thread is screwed and which moves the rotational shaft according to the rotation of the rotational shaft. The shaft-driving motor is preferably an ultrasonic motor.

A seat belt retractor of the present invention comprises the ultrasonic motor as mentioned above for rotating a reel. The rotation of the ultrasonic motor is transmitted to the reel without any slip due to a high pressing force of the pressing member. By reducing the pressing force, the rotational speed of the reel is reduced. By further reducing the pressing force of the pressing member to a very small amount or zero, the reel becomes freely rotatable relative to the ultrasonic motor.

DESCRIPTION OF THE PREFERRED EMBODIMENT

Figure 1:
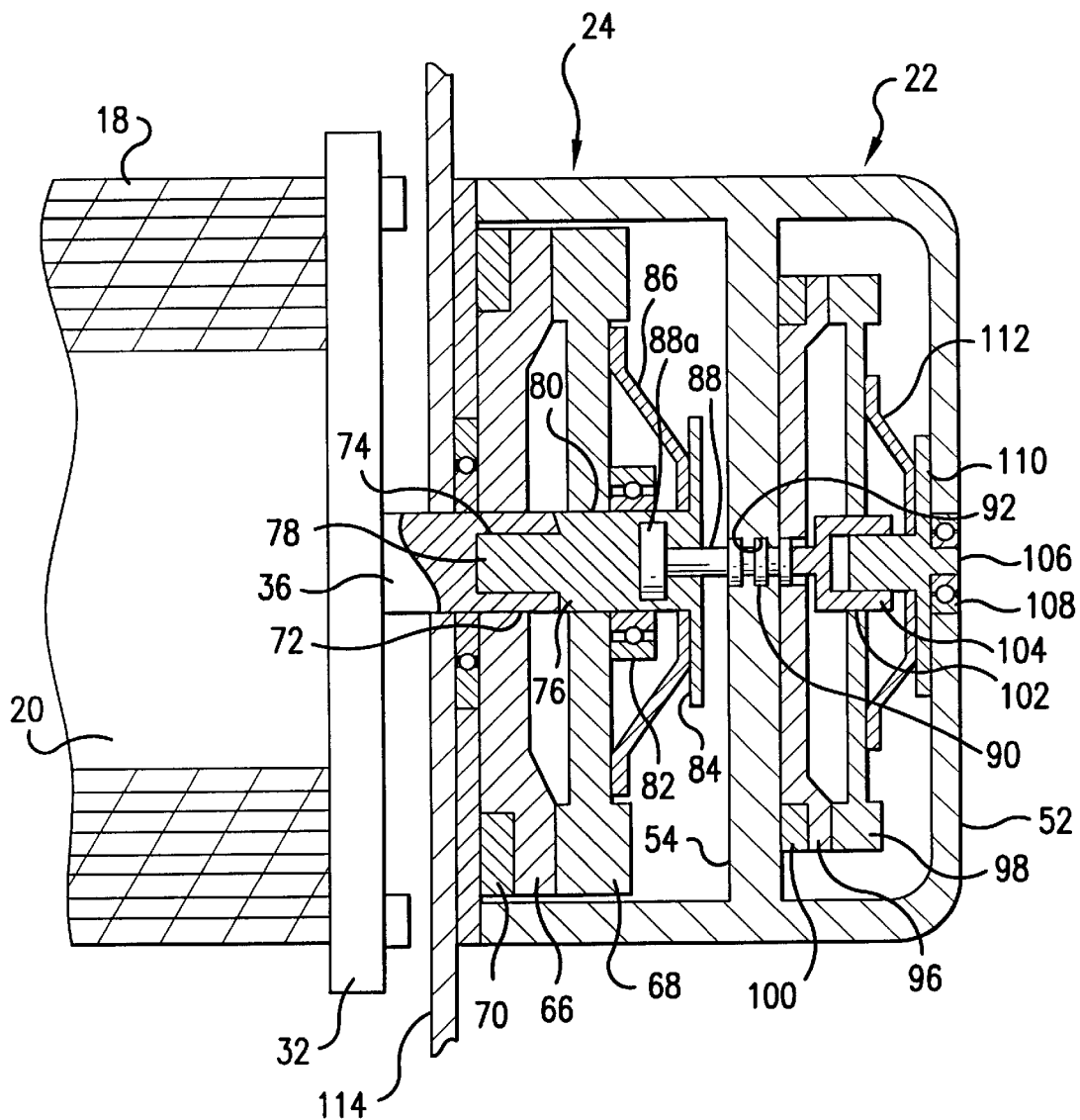
FIG. 1 is a sectional view of main parts of a seat belt retractor according to an embodiment.
Figure 2:
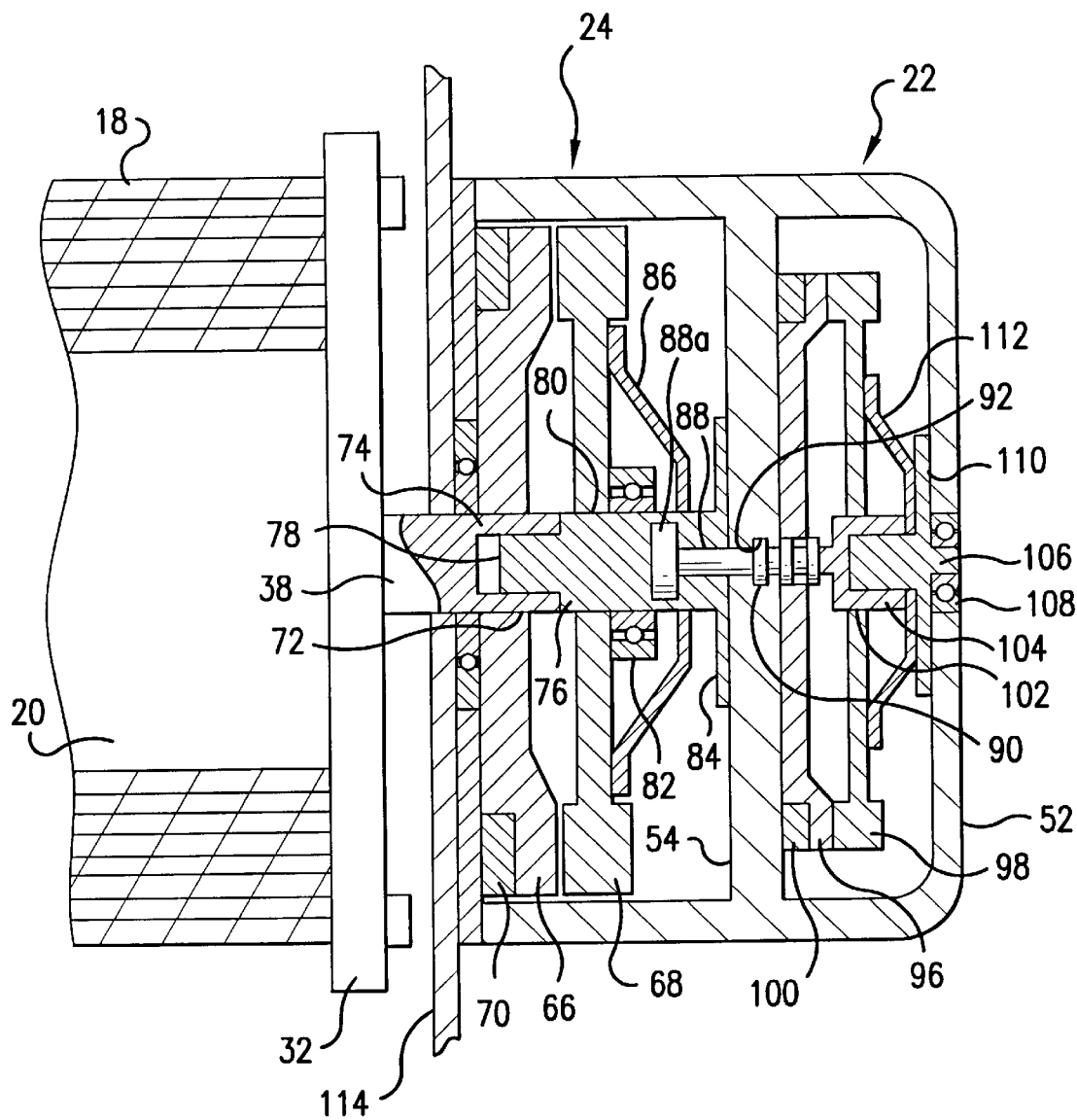
FIG. 2 is a sectional view of the main parts of the seat belt retractor according to the embodiment.
Figure 3:
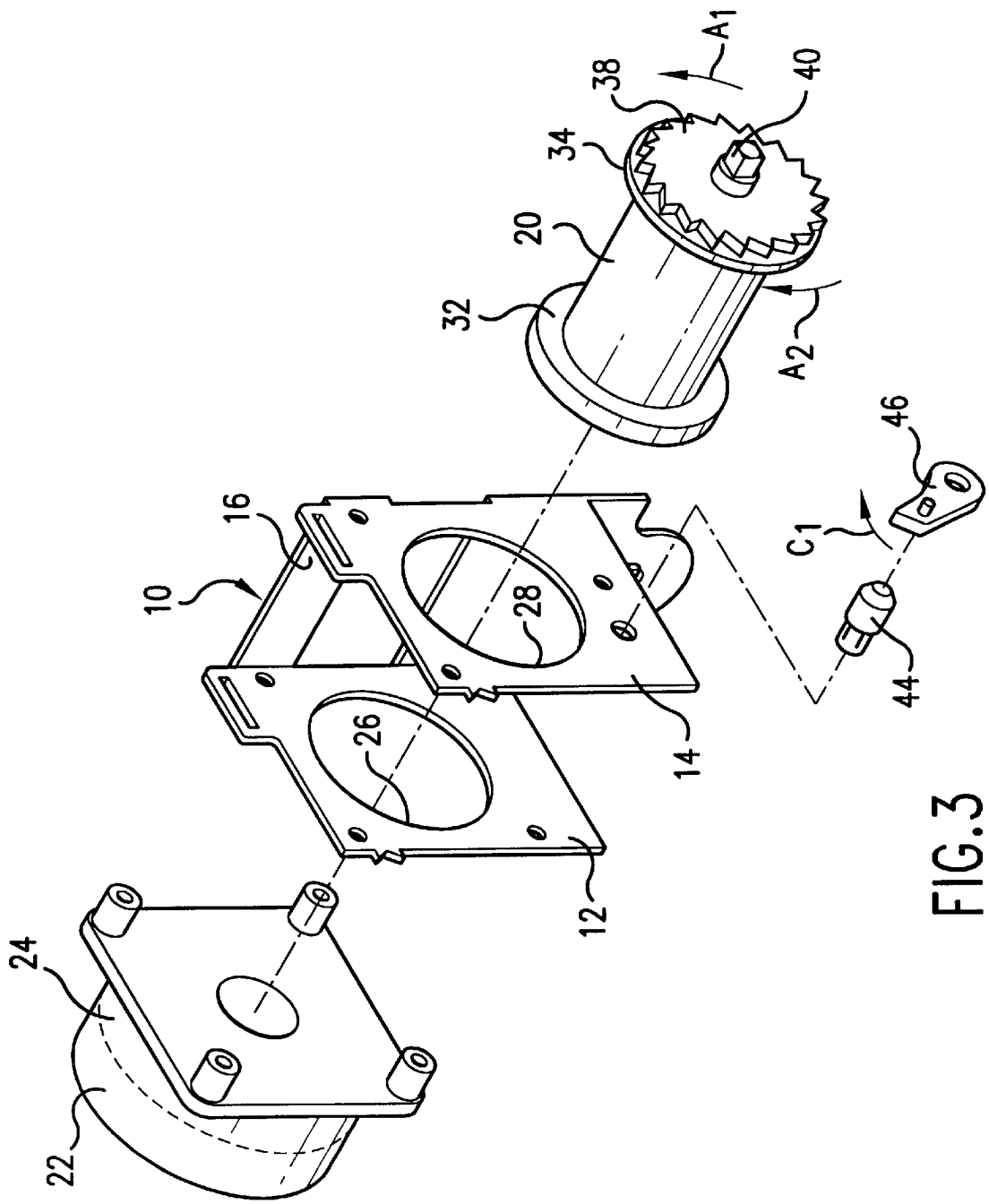
FIG. 3 is an exploded perspective view of parts of the seat belt retractor according to the embodiment.
Figure 4:
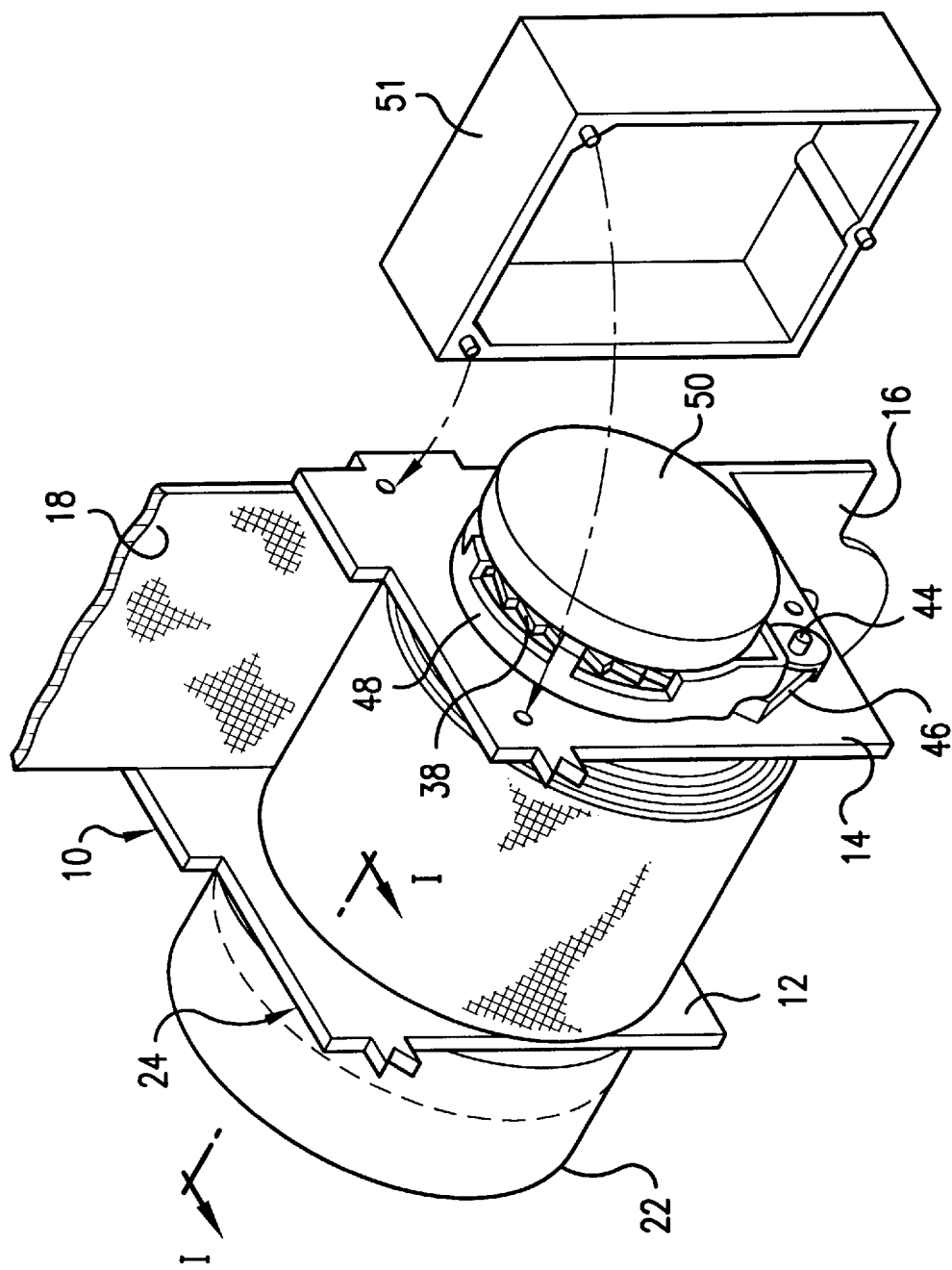
FIG. 4 is a perspective view of the seat belt retractor according to the embodiment.

FIGS. 1 through 4 show a seat belt retractor according to an embodiment of the present invention. FIGS. 1 and 2 are sectional views showing a driving part of an ultrasonic motor and taken along a line I—I of FIG. 4. FIG. 3 is an exploded perspective view of parts of the seat belt retractor and FIG. 4 is a perspective view of the seat belt retractor.

As shown in FIG. 3, a frame 10 of the seat belt retractor comprises a pair of side walls 12, 14 extending in parallel with each other and a back plate 16 connecting the side walls 12, 14. Disposed in the frame 10 is a reel 20 onto which a seat belt 18 is wound. Disposed outside of the side wall 14 is an emergency locking mechanism for the reel 20. And disposed outside of the side wall 12 are a clutch control ultrasonic motor 22 and a reel-driving ultrasonic motor 24 for rotating the reel 20. The reel 20 is rotated in a direction as indicated by the arrow $A_1$ of FIG. 3 when the seat belt 18 is withdrawn, and is rotated in a direction as indicated by the arrow $A_2$ when the seat belt 18 is wound.

The side walls 12, 14 are formed with supporting apertures 26, 28 coaxially. Disposed in the supporting apertures 26, 28 are flanges 32, 34 of the reel 20, respectively. The reel 20 has a cylindrical projecting shaft 36 at one end thereof and the projecting shaft 36 is inserted into the ultrasonic motor 24. The reel 20 has a ratchet wheel 38 and a projecting shaft 40 at the other end thereof and the projecting shaft 40 is connected to a reel-locking mechanism.

The reel-locking mechanism comprises a pawl 46 pivotally supported to the side wall 14 by a pivot pin 44, a lock ring 48 and a lock-ring-actuating mechanism which move the pawl 46 to pivot in a direction as indicated by the arrow $C_1$ to engage with the ratchet wheel 38 in the event of vehicle collision or emergency braking. The numeral 50 in FIG. 4 designates a flywheel cap as a part of the lock-ring-actuating mechanism. The numeral 51 designates a cover for covering the reel-locking mechanism.

Hereinafter, the clutch control ultrasonic motor 22 and the reel-driving ultrasonic motor 24 will be described with reference to FIGS. 1, 2. The motors 22, 24 are provided with a common motor casing 52 which is divided into chambers by a partition wall 54. A stator 66 and a rotor 68 of the reel-driving ultrasonic motor 24 are disposed in one of the chambers. The stator 66 is provided with an array of piezoelectric elements 70 arranged circumferentially thereof. The stator 66 has a central hole 72 into which the projecting shaft 36 of the reel 20 is rotatably inserted.

The projecting shaft 36 is formed with a square hole 74 at the tip thereof, into which a square projection 78 of a connection shaft 76 extending coaxially with the projecting shaft 36 is fitted. The connection shaft 76 is rotatably inserted into a central hole 80 of the rotor 68. The connection shaft 76 is rotatably connected to the rotor 68 by a bearing 82.

The connection shaft 76 is provided with a flange 84 at the end thereof and a dish-shape spring 86 is disposed between the flange 84 and the rotor 68 in the pressurized state.

An end of a clutch shaft 88 is rotatably connected to the connection shaft 76. The clutch shaft 88 is provided with a large-diameter portion 88a at the left side in FIGS. 1, 2. The large-diameter portion 88a is fitted to the connection shaft 76 in such a manner that the clutch shaft 88 and the connection shaft 76 are allowed to independently rotate in the circumferential direction and not allowed to move in a direction of separating from each other. The clutch shaft 88 is provided with a male thread 90 on the outer surface, which is screwed into a female thread 92 formed in the partition wall 54.

The clutch control ultrasonic motor 22 comprises a stator 96 and a rotor 98 confronting the stator 96. The stator 96 is provided with piezoelectric elements 100 arranged along the periphery thereof. The stator 96 is fixed to the partition wall 54.

The rotor 98 has a central hole 102 formed in a square shape into which a square portion 104 of the clutch shaft 88 is fitted. The square portion 104 has a circular concavity formed in the end thereof. A guide shaft 106 is rotatably inserted into the concavity. The guide shaft 106 is supported to the motor casing 52 by a bearing 108. The guide shaft 106 has a flange portion 110. A spring 112 is disposed between the flange portion 110 and the rotor 98 in the pressurized state.

The ultrasonic motors 22, 24 are mounted outside of the side wall 12 of the frame 10 through a mounting plate 114.

The description will now be made as regard to the operation of the ultrasonic motors 22, 24 structured as mentioned above.

In the state shown in FIG. 1, the clutch shaft 88 is in the forward-most position and the spring 86 is strongly presses the rotor 68 against the stator 66. In this state, by applying a voltage to the ultrasonic motor 24, the vibration of the piezoelectric elements 70 is transmitted to the rotor 68 to rotate the rotor 68. The torque of the rotor 68 is transmitted to the reel 20 to rotate the reel 20 through the connection shaft 76 and the projecting shaft 36.

At this point, the rotor 98 of the clutch control ultrasonic motor 22 is not moving and the clutch shaft 88 is also not moving. The large-diameter portion 88a of the clutch shaft 88 slides relative to the connecting shaft 76.

As shown in FIG. 2, by applying a voltage to the clutch control ultrasonic motor 22 to rotate the rotor 98 to move the clutch shaft 88 to the rear-most position, the connection shaft 76 to which the large-diameter portion 88a of the clutch shaft 88 is fitted also moves in a direction toward the right in FIG. 2 and the flange 84 of the connection shaft 76 moves apart from the stator 66 so that the flange 84 is separated from the spring 86. Therefore, the biasing force of the spring 86 applied to the rotor 68 is cancelled. As a result of this, even when high frequency voltage is applied to the piezoelectric elements 70 of the ultrasonic motor 24 so as to produce vibration in the stator 66, the rotor 68 is not rotated. Therefore, the reel 20 is free relative to the ultrasonic motor 24 so that it is freely ratable.

In an intermediate state between the state shown in FIG. 1 and the state shown in FIG. 2, by moving the clutch shaft 88, the biasing force of the spring 86 pressing the rotor 68 against the stator 66 can be adjusted. In this intermediate state, when the high frequency voltage is applied to the piezoelectric elements 70 to rotate the rotor 68, the rotor 68 rotates at a speed slower than the rated speed of the ultrasonic motor 24.

Accordingly, when the rated speed of the reel-driving ultrasonic motor 24 is larger than the suitable speed of the reel 20, the position of the clutch shaft 88 is adjusted to rotate the rotor 68.

To set the reel 20 to be free to withdraw the seat belt 18 from the retractor, the clutch shaft 88 is moved to the rear-most position as shown in FIG. 2.

In the above embodiment, through the ultrasonic motor 22 is employed for adjusting the biasing force of the spring 86 of the ultrasonic motor 24, another type of motor besides ultrasonic motor may be employed as a clutch control motor. In addition, the clutch shaft 88 may be moved by any linear actuator mechanism instead of the clutch control motor.

In the above embodiment, through the ultrasonic motor is applied to the seat belt retractor, the ultrasonic motor of the present invention may be applied any other fields besides the seat belt retractor.

As apparent from the above description, according to the present invention, the force for pressing the rotor to the stator in the ultrasonic motor can be adjusted so as to reduce the rotational speed of the output shaft of the ultrasonic motor or cancel the contact of the rotor with the stator so that the rotor becomes free to rotate relative to the stator.

The seat belt retractor of the present invention uses the ultrasonic motor as mentioned above to enable the reel to rotate at a suitable speed or make the reel to be free relative to the ultrasonic motor so as to freely rotate.

What is claimed is:

1. An ultrasonic motor, comprising:
    an annular stator having piezoelectric elements arranged in an annular shape,
    a rotor disposed to face the annular stator, and
    a pressing device for pressing the rotor to the annular stator, said pressing device including a threaded member situated near the rotor and a rotating member connected to the threaded member for rotating the same to adjust a relative position of the threaded member to the annular stator so that when the threaded member is rotated by the rotating member, the rotor is moved between a first position where the rotor is separated from the stator, and a second position where the rotor is strongly pressed to the stator, while a pressure of the rotor to the annular stator is adjusted between the first and second positions.

2. An ultrasonic motor according to claim 1, wherein said pressing device further includes a connecting shaft connected to the threaded member to be freely rotatable in a circumferential direction relative to the threaded member and movable in an axial direction together with the threaded member, and a pressing spring situated between the connecting shaft and the rotor for resiliently pressing the rotor.

3. An ultrasonic motor according to claim 2, wherein said connecting shaft rotates when the rotor rotates.

4. An ultrasonic motor according to claim 3, further comprising a casing having a partition wall with a threaded hole and covering the annular stator, rotor and pressing device, said threaded member being a threaded shaft engaging and passing through the threaded hole.

5. An ultrasonic motor according to claim 1, wherein said rotating member is a second ultrasonic motor including a second annular stator having piezoelectric elements arranged in an annular shape, and a second rotor disposed to face the second annular stator and engaging the threaded member.

6. An ultrasonic motor according to claim 5, wherein said second ultrasonic motor further includes a pressing spring for pressing the second rotor to the second annular stator.

7. A seat belt retractor comprising:

a reel having a reel shaft, a seat belt wound around the reel, and an ultrasonic motor according to claim 1, said reel shaft being connected to the rotor through the threaded member.

8. A seat belt retractor according to claim 7, wherein said rotor is moved in the first position when the seat belt is to be withdrawn quickly, and said rotor is moved in the second position when the seat belt is to be retracted quickly.

* * * * *